(12) United States Patent
Valvano et al.

(10) Patent No.: US 7,793,765 B2
(45) Date of Patent: Sep. 14, 2010

(54) MULTI-DISC BRAKE WITH REINFORCING RIB

(76) Inventors: Thomas V. Valvano, 785 Sue Ct., Saginaw, MI (US) 48609; Marshall D. Snyder, 8175 S. Bever Rd., Birch Run, MI (US) 48415; Patrick N. Hopkins, 36275 Congress Rd., Farmington Hills, MI (US) 48335; Martin J. Reder, 1073 Hampstead, Essexville, MI (US) 48732

( * ) Notice: Subject to any disclaimer, the term of this patent is extended or adjusted under 35 U.S.C. 154(b) by 214 days.

(21) Appl. No.: 11/327,850

(22) Filed: Jan. 9, 2006

(65) Prior Publication Data
US 2007/0158143 A1    Jul. 12, 2007

(51) Int. Cl.
F16D 65/00    (2006.01)
F16D 65/827   (2006.01)

(52) U.S. Cl. ............... 188/73.1; 188/73.31; 188/73.37; 188/71.5

(58) Field of Classification Search ............. 188/73.31, 188/73.43, 71.5, 18 A, 72.1, 218 R, 73.36, 188/73.37, 73.39, 73.1
See application file for complete search history.

(56) References Cited

U.S. PATENT DOCUMENTS

| | | | | |
|---|---|---|---|---|
| 4,747,472 | A  * | 5/1988 | Rath et al. ................. | 188/73.1 |
| 6,189,659 | B1 * | 2/2001 | Doi et al. ................. | 188/73.35 |
| 6,609,594 | B1 * | 8/2003 | Charmat et al. .......... | 188/73.45 |
| 6,705,437 | B2 * | 3/2004 | Severinsson et al. ..... | 188/73.32 |
| 6,725,981 | B1 * | 4/2004 | Franz ....................... | 188/73.45 |
| 7,213,688 | B2 * | 5/2007 | Hendrich et al. ........... | 188/71.5 |
| 2007/0170020 | A1 * | 7/2007 | Halasy-Wimmer et al. ....... | 188/73.43 |

FOREIGN PATENT DOCUMENTS

WO    WO-2005078306 A1 *  8/2005

* cited by examiner

*Primary Examiner*—Melody M Burch
(74) *Attorney, Agent, or Firm*—Dickinson Wright PLLC

(57) ABSTRACT

The invention provides a multi-disc brake for a vehicle. A knuckle supports a wheel of a vehicle. A hub is mounted for rotation on the knuckle about a rotation axis. A pair of discs are mounted for rotation with the hub and for sliding movement on the hub along the rotation axis. Each of the discs includes respective inboard and outboard engaging surfaces. Brake pad assemblies are disposed about the discs to engage the engaging surfaces. The brake pad assemblies slide along the rotation axis relative to the hub. A brake fist having a bridge portion extends outboard from the knuckle around the discs and the brake pad assemblies to an outboard wall supporting the outboard brake pad assembly against outboard movement along the rotation axis. An actuator urges the discs and the brake pad assemblies together against the outboard wall to slow rotation of the hub. A first bolt extends along a first bolt axis and a second bolt extends along a second bolt axis spaced from the first bolt axis across the outboard wall for connecting the brake fist to the knuckle. A reinforcing rib extends outwardly from and across the outboard wall to intersect both of the first bolt axis and the second bolt axis in a plane perpendicular to the discs for limiting deflection of the outboard wall.

8 Claims, 5 Drawing Sheets

US 7,793,765 B2

MULTI-DISC BRAKE WITH REINFORCING RIB

FIELD OF THE INVENTION

The invention relates to a brake for a vehicle and more specifically to a brake having multiple discs.

BACKGROUND OF THE INVENTION

Vehicles can have hub supports known as stub axles or steering knuckles. These structures support a hub for rotation about an axis. The hub can support the wheel of the vehicle, such as a carrying wheel or a steered wheel. Disc brakes can be associated with the hub to slow rotation of the wheel supported on the hub. One or more discs are fixed for rotation to the hub and are slowed by one or more brake pad assemblies having backing plates and friction material pads which engage opposite surfaces of the one or more discs. A piston and cylinder assembly can be used to bring the brake pad assemblies into force-applying engagement with the one or more discs.

SUMMARY OF THE INVENTION

The invention provides a multi-disc brake for a vehicle. The multi-disc brake includes a knuckle for supporting a wheel of a vehicle. The multi-disc brake also includes a hub mounted for rotation on the knuckle about a rotation axis. The multi-disc brake also includes an inboard disc mounted for rotation with the hub and for sliding movement on the hub along the rotation axis and having a first inboard engaging surface and a first outboard engaging surface. The multi-disc brake also includes an outboard disc mounted for rotation with the hub and for sliding movement on the hub along the rotation axis and having a second inboard engaging surface and a second outboard engaging surface. The multi-disc brake also includes an inboard brake pad assembly disposed adjacent to the first inboard engaging surface of the inboard disc for sliding movement along the rotation axis relative to the hub. The multi-disc brake also includes an outboard brake pad assembly disposed adjacent to the second outboard engaging surface of the outboard disc. The multi-disc brake also includes a center brake pad assembly disposed between the first outboard engaging surface of the inboard disc and the second inboard engaging surface of the outboard disc for sliding movement along the rotation axis relative to the hub. The multi-disc brake also includes a brake fist having a bridge portion extending outboard from the knuckle around the discs and the brake pad assemblies to an outboard wall supporting the outboard brake pad assembly against outboard movement along the rotation axis. The multi-disc brake also includes an actuator for urging the discs and the brake pad assemblies together against the outboard wall to slow rotation of the hub. The multi-disc brake also includes a first bolt extending along a first bolt axis and a second bolt extending along a second bolt axis spaced from the first bolt axis across the outboard wall for connecting the brake fist to the knuckle. The multi-disc brake also includes a reinforcing rib extending outwardly from and across the outboard wall to intersect both of the first bolt axis and the second bolt axis in a plane perpendicular to the discs for limiting deflection of the outboard wall.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
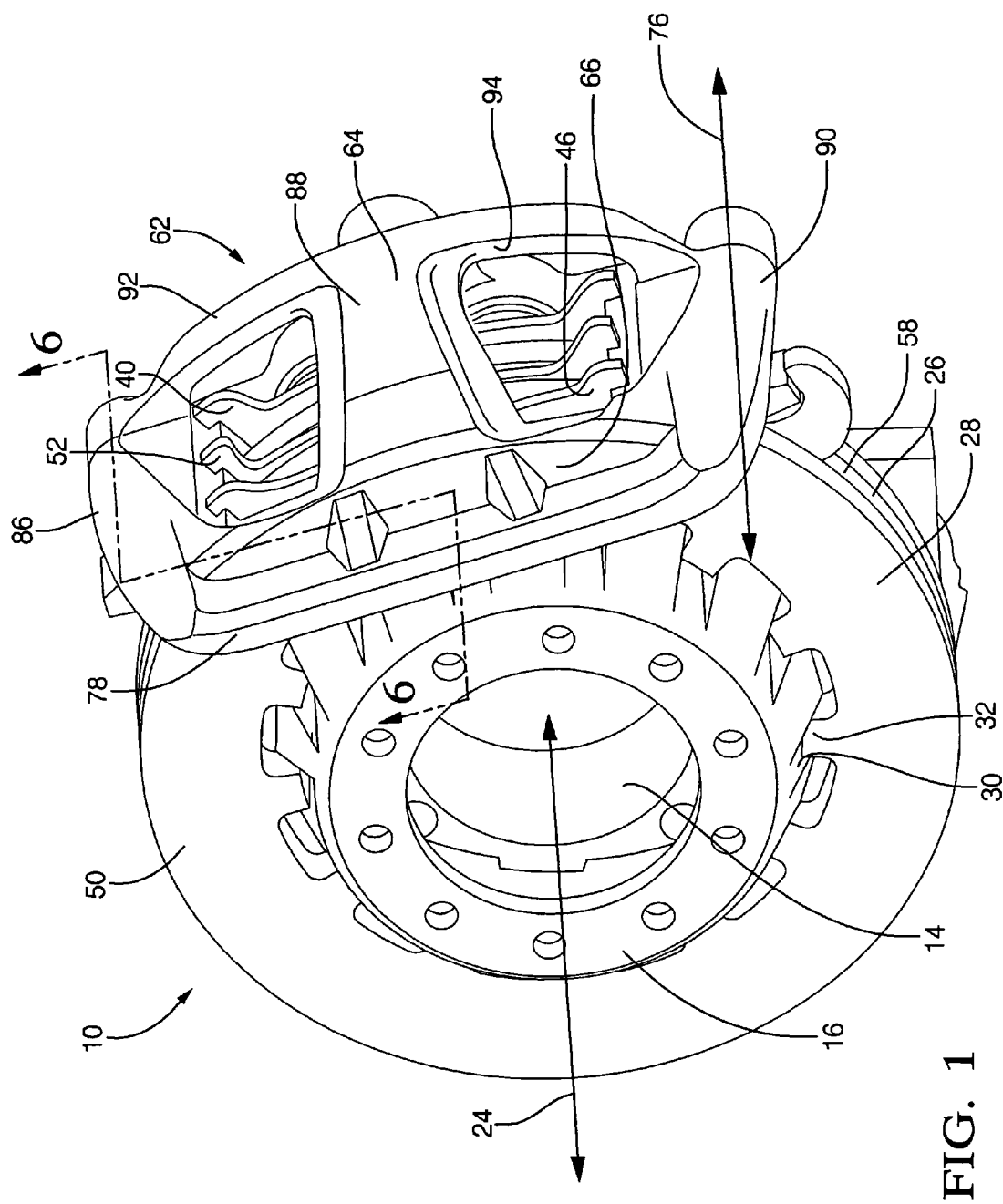
FIG. 1 is a first perspective view of a multi-disc brake according to the exemplary embodiment of the invention.
Figure 2:
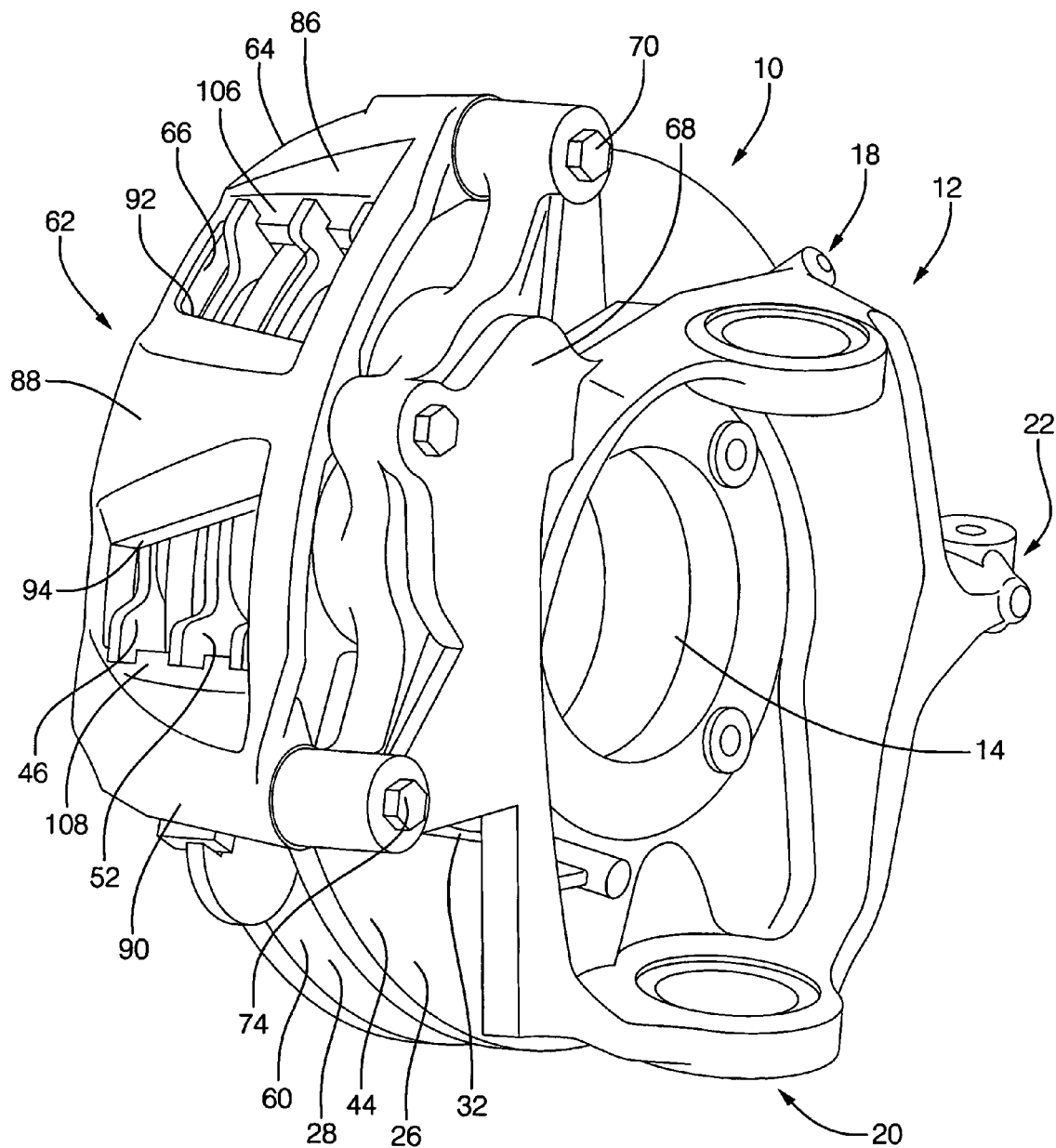
FIG. 2 is a second perspective view of the multi-disc brake according to the exemplary embodiment of the invention.

A plurality of different embodiments of the invention are shown in the Figures of the application. Similar features are shown in the various embodiments of the invention. Similar features have been numbered with a common reference numeral and have been differentiated by an alphabetic designation. Also, to enhance consistency, features in any particular drawing share the same alphabetic designation even if the feature is shown in less than all embodiments. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

Referring now to the Figures of the application, a multi-disc brake 10 comprises a knuckle 12. The exemplary knuckle 12 is for use in conjunction with a front wheel of a front wheel-drive car. In alternative embodiments of the invention, the knuckle 12 could be disposed adjacent a non-steerable wheel of the vehicle. The knuckle 12 comprises a hollow cylindrical portion 14 which provides support for a hub 16, described in greater detail below. The knuckle 12 also includes structure for mounting the knuckle 12 on a vehicle. The structure of the exemplary knuckle 12 for mounting includes a top mounting portion 18 and a bottom mounting portion 20. Either or both of the top mounting portion 18 and the bottom mounting portion 20 can accommodate a strut and/or a pin of a ball joint to connect the knuckle 12 to a tie bar. The exemplary knuckle 12 also comprises a steering arm 22 for connection to a track rod of the steering system of the vehicle. The knuckle 12 can be a one-piece casting.

The cylindrical portion 14 supports the hub 16 for rotation relative to the knuckle 12 about a rotation axis 24. The hub 16 can be driven by a constant velocity joint which is received in the hub 16 in a conventional manner. Bearings (not visible) can be disposed between the cylindrical portion 14 and the hub 16 to limit friction between the cylindrical portion 14 and the hub 16. The hub 16 supports first and second discs, and inboard disc 26 and an outboard disc 28. The inboard and outboard discs 26, 28 are engaged with the hub 16 to rotate with the hub 16 and to slide relative to the hub 16 along the rotation axis 24. The exemplary inboard and outboard discs 26, 28 are engaged with the exemplary hub 16 by cooperating grooves and tabs, grooves 30 formed in the hub 16 receiving tabs 32 formed by each of the inboard and outboard discs 26, 28.

The exemplary multi-disc brake 10 also includes an inboard brake pad assembly 34, an outboard brake pad assembly 36, and a center brake pad assembly 38. The inboard brake pad assembly 34 includes a backing plate 40 and a pad 42 of friction material. The pad 42 is disposed adjacent to a first inboard engaging surface 44 of the inboard disc 26 and engages the surface 44 during braking. The outboard brake pad assembly 36 includes a backing plate 46 and a pad 48 of friction material. The pad 48 is disposed adjacent to a second outboard engaging surface 50 of the outboard disc 28 and engages the surface 50 during braking. The center brake pad assembly 38 includes a backing plate 52 and a first pad 54 disposed on an inboard side of the backing plate 52 and a second pad 56 disposed on an outboard side of the backing plate 52. The pad 54 is disposed adjacent to a first outboard engaging surface 58 of the inboard disc 26 and engages the surface 58 during braking. The pad 56 is disposed adjacent a second inboard engaging surface 60 of the outboard disc 28 and engages the surface 60 during braking.

The exemplary multi-disc brake 10 also includes a brake fist 62 having a bridge portion 64 extending outboard from the knuckle 12 around the discs 26, 28 and the brake pad assemblies 34, 36, 38 to an outboard wall 66 supporting the outboard brake pad assembly 36 against outboard movement along the rotation axis 24. The exemplary bridge portion includes three portions 86, 88, 90 spaced from one another and defining two windows 92, 94.

The exemplary multi-disc brake 10 also includes an actuator 68 for urging the discs 26, 28 and the brake pad assemblies 34, 36, 38 together against the outboard wall 66 to slow rotation of the hub 16. The actuator 68 includes at least one aperture (not visible) defined by the knuckle 12 and a corresponding piston in each aperture. Fluid is directed to the one or more apertures to urge the one or more pistons against the inboard brake pad assembly 34. The piston urges both discs 26, 28 and the brake pad assemblies 34, 36, 38 against the outboard wall 66 to slow the hub 16.

The exemplary multi-disc brake 10, 10a also includes a first bolt 70 extending along a first bolt axis 72 and a second bolt 74 extending along a second bolt axis 76 spaced from the first bolt axis 72 across the outboard wall 66 for connecting the brake fist 62 to the knuckle 12. The first bolt 70 is received in an aperture 96 defined in the portion 86 of the bridge portion 64. The second bolt 74 is received in an aperture 98 defined in the portion 90 of the bridge portion 64.

Figure 3:
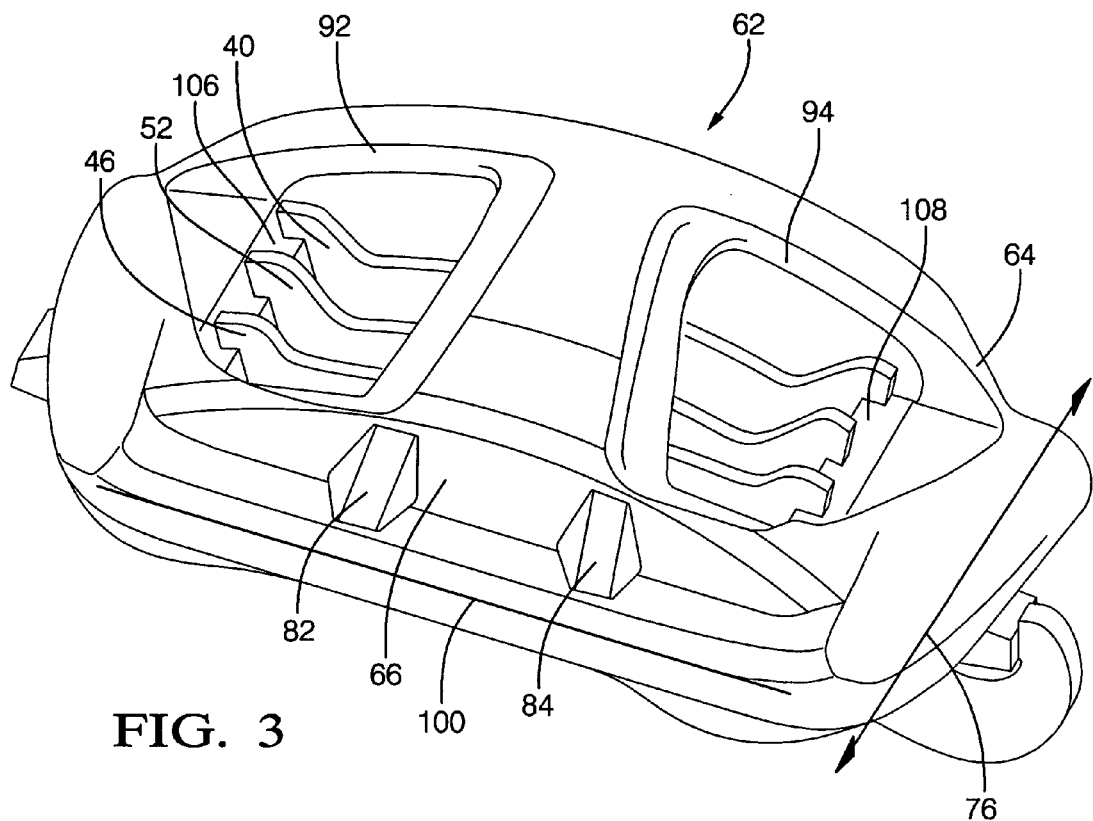
FIG. 3 is a first perspective view of a brake fist according to the exemplary embodiment of the invention.
Figure 4:
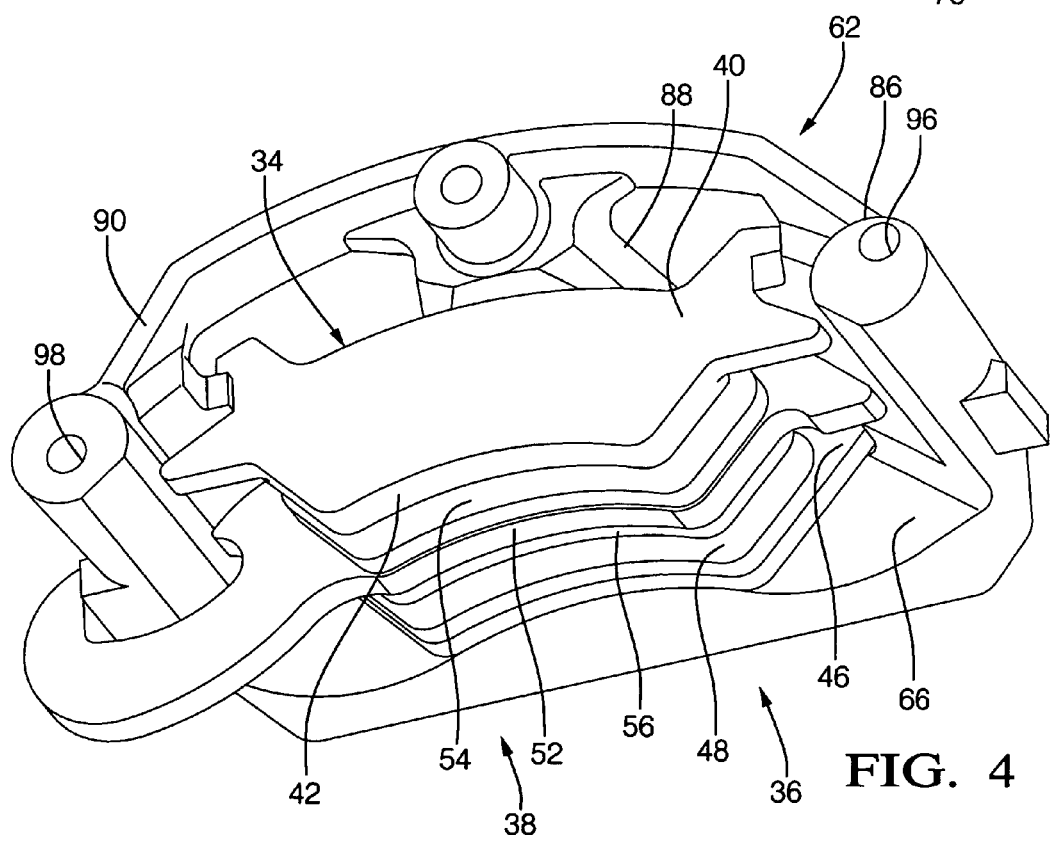
FIG. 4 is a second perspective view of the brake fist according to the exemplary embodiment of the invention.
Figure 5:
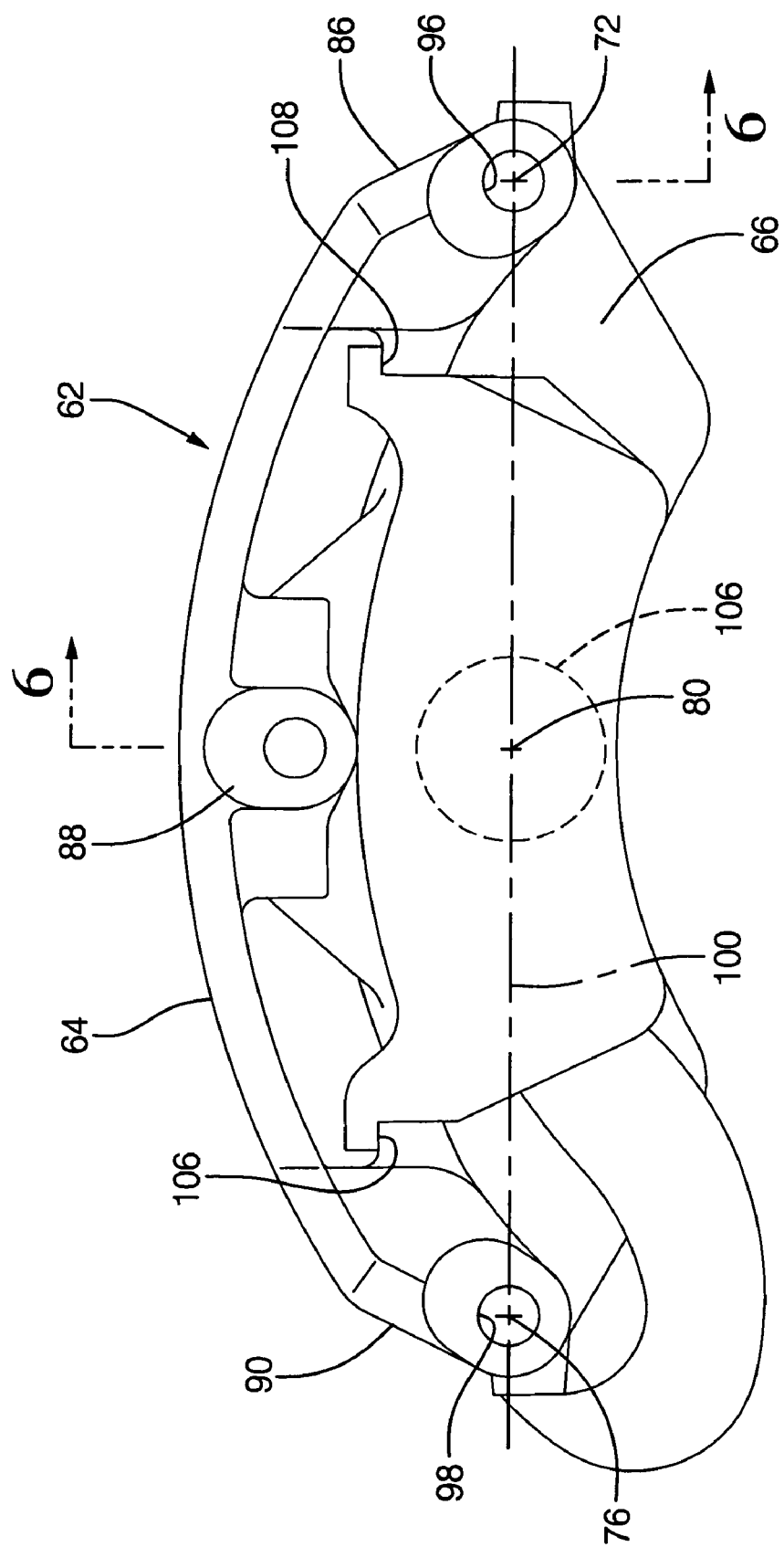
FIG. 5 is a planar view showing the spatial arrangement of a reinforcing rib and first and second bolt axis according to the exemplary embodiment of the invention.
Figure 6:
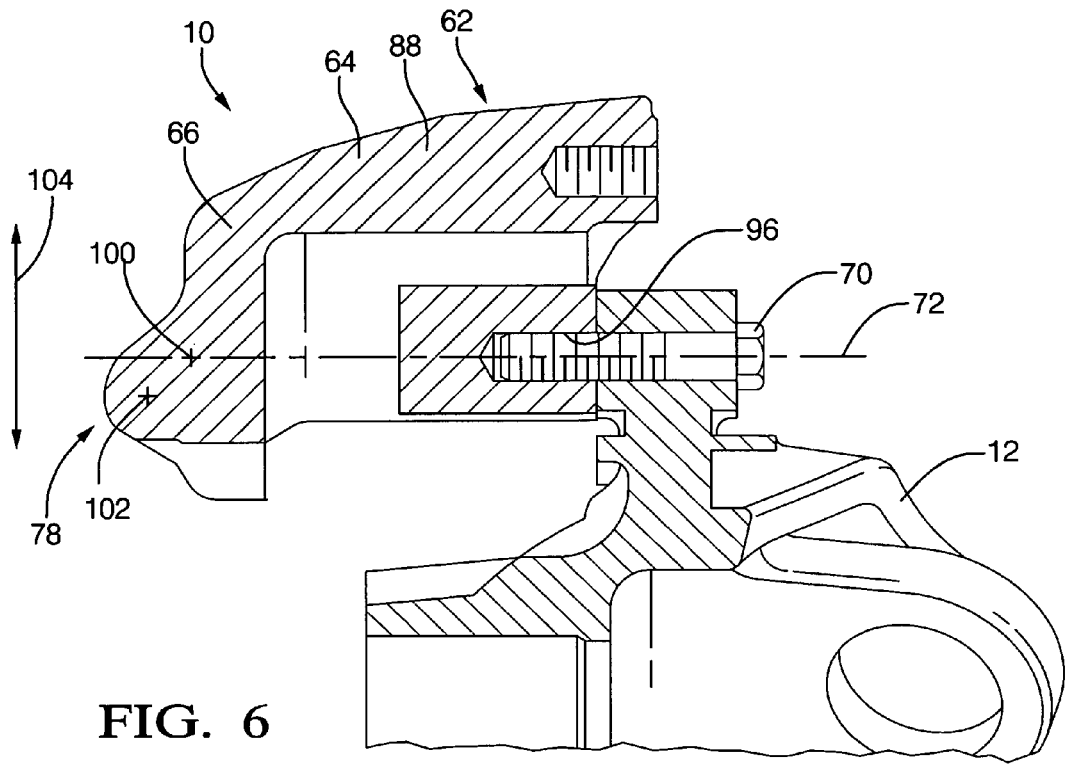
FIG. 6 is a cross-sectional view taken along section lines 6-6 in FIG. 1 showing the reinforcing rib intersecting one of the bolt axis.

The exemplary multi-disc brake 10 also includes a reinforcing rib 78 extending outwardly from and across the outboard wall 66. The reinforcing rib 78 intersects both of the first bolt axis 72 and the second bolt axis 76 in a plane perpendicular to the discs 26, 28 for limiting deflection of the outboard wall 66. FIG. 3 shows a longitudinal axis 100 of the rib 78 intersecting the second bolt axis 76. The longitudinal axis 100 is spaced from a cross-sectional center 102 of the rib 78. FIG. 5 shows the longitudinal axis 100 intersecting both the second bolt axis 76 and the first bolt axis 72. The reinforcing rib 78 is substantially straight in a plane perpendicular to the rotation axis 24. FIG. 6 shows the relative position of the longitudinal axis 100 in the rib and the intersection of the axis 100 with the first bolt axis 72.

Figure 7:
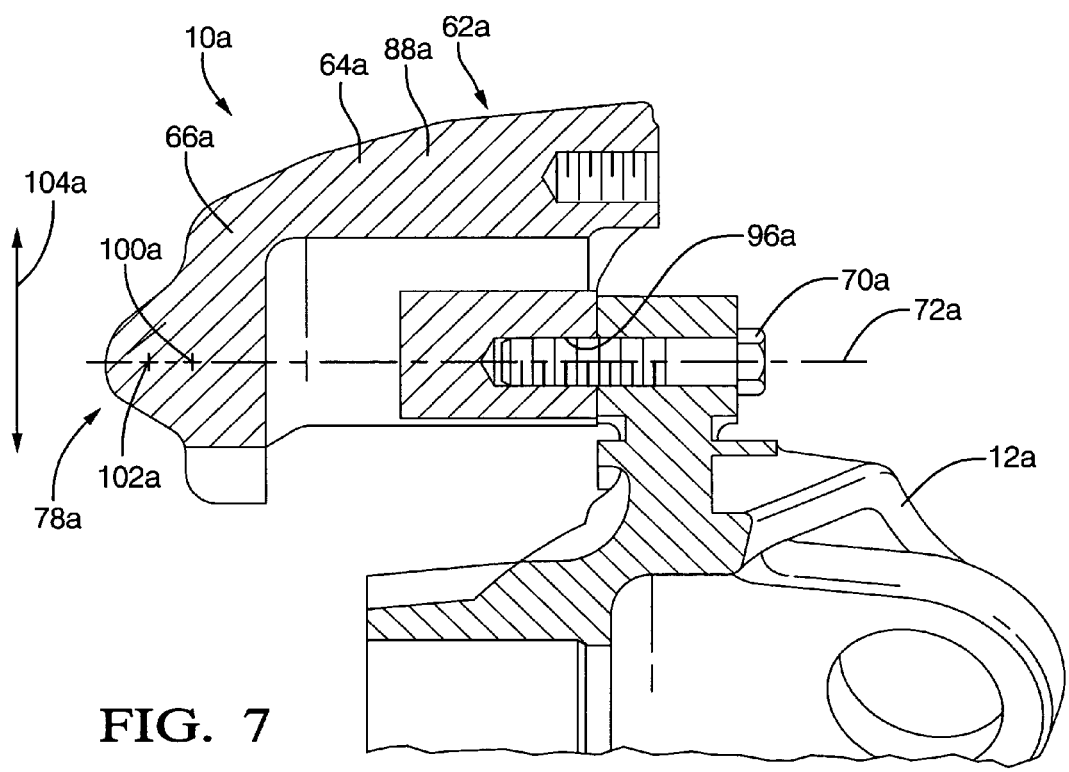
FIG. 7 is a cross-sectional view similar to the cross-section of FIG. 6 showing an alternative embodiment of the invention wherein a reinforcing rib is centered and intersecting one of the bolt axis.

FIG. 7 shows an alternative embodiment of the invention wherein a multi-disc brake 10a includes a knuckle 12a connected to a brake fist 62a with bolts, such as bolt 70a extending along a bolt axis 72a. The bolt 70a is received in an aperture 96a defined by a bridge portion 64a of the brake fist 62a. The bridge portion 64a includes a portion 88a extending from the knuckle 12a to an outboard wall 66a. A reinforcing rib 78a is centered at a point 102a disposed along the axis 72a. An axis 100a passing through the center 102a and the axis 72a intersects a second bolt axis (not shown). In other words, a cross-sectional view of the same plane, viewed in the opposite direction, would look the same as FIG. 7, showing the axis 100a passing through the center 102a and the second bolt axis.

The center 102 of the rib 78 can be moved along an axis 104 perpendicular to the bolt axis 72 to optimize the position of the reinforcing rib. The rib 78 intersects the axis 72 while the center 102 is below the axis 72 in FIG. 6. The rib 78a intersects the axis 72a while the center 102a is on the axis 72a in FIG. 7. In alternative embodiments of the invention, the rib 78 could intersect the axis 72 while the center 102 is above the axis 72.

In the exemplary embodiment of the invention, the actuator 68 moves along an actuation axis 80, shown in FIG. 5. FIG. 5 also shows a circle 106 in dash representing the position of a piston of the actuator 68. The reinforcing rib 78 intersects the actuation axis 80. The rib 78 can be centered on the axis 80 or offset, as the rib 78 is intersecting and offset with respect to the axis 72. The rib 78 can both intersect the axis 72, 76, 80 and be offset from the axis 72, 76, 80 since the rib 78 is a three-dimensional structure and the axis 72, 76, 80 are two-dimensional.

The exemplary multi-disc brake 10 also includes first and second secondary ribs 82, 84 extending outwardly from the outboard wall 66 transverse to the reinforcing rib 78. The ribs 82, 84 extend between the reinforcing rib 78 and the bridge portion 64 and are spaced from one another. The ribs 82, 84 further limit outboard deflection of the outboard wall 66.

In another aspect of the exemplary embodiment of the invention, the brake first 62 includes first and second abutment surfaces 106, 108. The abutment surface 106 is formed integrally with the portion 86 of the bridge portion 64 and the abutment surface 108 is formed integrally with the portion 90 of the bridge portion 64. The inboard and center brake pad assemblies 34, 38 ride on the abutment surfaces 106, 108 during braking operations. The abutment surfaces 106, 108 also limit tangential rotation of the brake pad assemblies 34, 36, 38 relative to the discs 26, 28. The stiffness of the brake fist is enhanced and allows the knuckle 12 to be formed from a softer material.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:
1. A multi-disc brake comprising:
a knuckle for supporting a wheel;
a hub mounted for rotation on said knuckle about a rotation axis;
an inboard disc mounted for rotation with said hub and for sliding movement on said hub along said rotation axis and having a first inboard engaging surface and a first outboard engaging surface;

an outboard disc mounted for rotation with said hub and for sliding movement on said hub along said rotation axis and having a second inboard engaging surface and a second outboard engaging surface;

an inboard brake pad assembly disposed adjacent to said first inboard engaging surface of said inboard disc for sliding movement along said rotation axis relative to said hub;

an outboard brake pad assembly disposed adjacent to said second outboard engaging surface of said outboard disc;

a center brake pad assembly disposed between said first outboard engaging surface of said inboard disc and said second inboard engaging surface of said outboard disc for sliding movement along said rotation axis relative to said hub;

a brake fist having a bridge portion extending outboard from said knuckle around said discs and said brake pad assemblies to an outboard wall for supporting said outboard brake pad assembly against outboard movement along said rotation axis;

an actuator for urging said discs and said brake pad assemblies together against said outboard wall to slow rotation of said hub;

a first bolt extending along a first bolt axis and a second bolt extending along a second bolt axis spaced from said first bolt axis across said outboard wall for connecting said brake fist to said knuckle; and a reinforcing rib extending along a longitudinal axis from said first bolt axis to said second bolt axis, said reinforcing rib extending outwardly from and across said outboard wall in a plane perpendicular to said inboard and said outboard discs, wherein said first bolt axis extends through a first center point of said reinforcing rib and said second bolt axis extends through a second center point of said reinforcing rib such that said reinforcing rib limits deflection of said outboard wall, and wherein said reinforcing rib is formed directly on and is connected to said outboard wall along said longitudinal axis continuously in one connection from said first bolt axis to said second bolt axis.

2. The multi-disc brake of claim 1 wherein said actuator is further defined as being movable along an actuation axis and wherein said reinforcing rib is further defined as intersecting said actuation axis.

3. The multi-disc brake of claim 1 wherein said outboard wall of said brake fist presents an outer periphery and said reinforcing rib is continuously spaced from said outer periphery of said outboard wall between said first and second bolt axes.

4. The multi-disc brake of claim 3 further comprising: at least one secondary rib extending from a first end engaging said outboard wall between said outer periphery and said reinforcing rib to a second end engaging said reinforcing rib for limiting deflection of said outboard wall.

5. The multi-disc brake of claim 4 wherein said at least one secondary rib is further defined as extending between said reinforcing rib and said bridge portion.

6. The multi-disc brake of claim 5 wherein said at least one secondary rib further comprises: first and second secondary ribs spaced from one another.

7. The multi-disc brake of claim 6 wherein said brake fist further comprises first and second abutment surfaces integrally formed with said bridge portion for guiding movement of said inboard brake pad assembly and said center brake pad assembly.

8. The multi-disc brake of claim 1 wherein said brake fist and said reinforcing rib are formed as an integral body.

* * * * *